US011550399B2

(12) United States Patent
Hastings et al.

(10) Patent No.: US 11,550,399 B2
(45) Date of Patent: Jan. 10, 2023

(54) SHARING ACROSS ENVIRONMENTS

(71) Applicant: Microsoft Technology Licensing, LLC, Redmond, WA (US)

(72) Inventors: Ryan Lucas Hastings, Seattle, WA (US); Daniel McCulloch, Snohomish, WA (US); Michael John Patten, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 170 days.

(21) Appl. No.: 17/067,476

(22) Filed: Oct. 9, 2020

(65) Prior Publication Data

US 2021/0026457 A1 Jan. 28, 2021

Related U.S. Application Data

(63) Continuation of application No. 15/199,470, filed on Jun. 30, 2016, now Pat. No. 10,838,502.
(Continued)

(51) Int. Cl.
*G06F 3/048* (2013.01)
*G06F 3/01* (2006.01)
(Continued)

(52) U.S. Cl.
CPC .............. *G06F 3/017* (2013.01); *G06F 3/011* (2013.01); *G06F 3/03545* (2013.01);
(Continued)

(58) Field of Classification Search
CPC ...... G06F 3/017; G06F 3/011; G06F 3/03545; G06F 3/048; G06F 3/04842; G06F 3/04883; G06F 3/1454; G06F 21/32; G06F 3/04162; G06F 3/0486; G06F 3/0488; G06T 19/006; H04L 67/06
See application file for complete search history.

(56) References Cited

U.S. PATENT DOCUMENTS 8,321,787 B2 * 11/2012 Castelli ................... G06F 16/95
715/744
8,943,582 B1 1/2015 Zhou et al.
(Continued)

FOREIGN PATENT DOCUMENTS

| CN | 103781522 A | 5/2014 |
| CN | 103946732 A | 7/2014 |
| EP | 0990461 A2 | 4/2000 |

OTHER PUBLICATIONS

"Office Action Issued in European Patent Application No. 17718640.0", dated Apr. 9, 2021, 4 Pages.
(Continued)

*Primary Examiner* — Steven B Theriault

(57) ABSTRACT

Techniques for sharing across environments are described. Generally, different types of input may be employed to share content, such as using a pen, a stylus, a finger, touchless gesture input, and so forth. According to various embodiments, content may be shared between devices in local proximity, and/or between devices that are remote from one another. In at least some embodiments, content is shared based on an identity of a sharing user and/or sharing device.

20 Claims, 10 Drawing Sheets

Related U.S. Application Data

(60) Provisional application No. 62/314,681, filed on Mar. 29, 2016.

(51) Int. Cl.
  *G06F 21/32* (2013.01)
  *G06F 3/0354* (2013.01)
  *G06F 3/04842* (2022.01)
  *G06F 3/04883* (2022.01)
  *G06F 3/14* (2006.01)
  *G06T 19/00* (2011.01)
  *H04L 67/06* (2022.01)

(52) U.S. Cl.
  CPC .......... *G06F 3/048* (2013.01); *G06F 3/04842* (2013.01); *G06F 3/04883* (2013.01); *G06F 3/1454* (2013.01); *G06F 21/32* (2013.01); *G06T 19/006* (2013.01); *H04L 67/06* (2013.01)

(56) References Cited

U.S. PATENT DOCUMENTS

| | | | | |
|---|---|---|---|---|
| 9,649,566 | B2* | 5/2017 | Mahajan | A63F 13/216 |
| 2009/0209236 | A1* | 8/2009 | Bloebaum | G06N 3/006 |
| | | | | 345/473 |
| 2009/0253494 | A1* | 10/2009 | Fitch | A63F 13/12 |
| | | | | 463/25 |
| 2011/0055927 | A1* | 3/2011 | Hamilton, II | G06Q 30/02 |
| | | | | 715/753 |
| 2015/0058753 | A1* | 2/2015 | Anderson | G06T 11/60 |
| | | | | 715/753 |
| 2016/0350973 | A1* | 12/2016 | Shapira | G06F 3/016 |

OTHER PUBLICATIONS

"Second Office Action Issued in Chinese Patent Application No. 201780021005.4", dated Jun. 2, 2021, 5 Pages.(MS# 359624-CN-PCT).

"Search Report Issued in European Patent Application No. 21188186.7", dated Nov. 19, 2021, 7 Pages.

"First Office Action and Search Report Issued in Chinese Patent Application No. 201780021005.4", dated Nov. 18, 2020, 13 Pages.

* cited by examiner

SHARING ACROSS ENVIRONMENTS

PRIORITY

This application claims priority to both U.S. Provisional Application Ser. No. 62/314,681 entitled "Sharing Across Environments" filed Mar. 29, 2016, and U.S. Non-Provisional patent application Ser. No. 15/199,470 entitled "Sharing Across Environments" filed Jun. 30, 2016. The disclosures of both of the foregoing applications are hereby incorporated by reference in their entireties.

BACKGROUND

Devices today (e.g., computing devices) typically support a variety of different input techniques. For instance, a particular device may receive input from a user via a keyboard, a mouse, voice input, touch input (e.g., to a touchscreen), and so forth. One particularly intuitive input technique enables a user to utilize a touch instrument (e.g., a pen, a stylus, a finger, and so forth) to provide freehand input to a touch-sensing functionality such as a touchscreen, which is interpreted as digital ink. Current techniques for freehand input have difficulty using such input to share content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for sharing across environments are described. Generally, different types of input may be employed to share content, such as using a pen, a stylus, a finger, touchless gesture input, and so forth. According to various embodiments, content may be shared between devices in local proximity, and/or between devices that are remote from one another. In at least some embodiments, content is shared based on an identity of a sharing user and/or sharing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
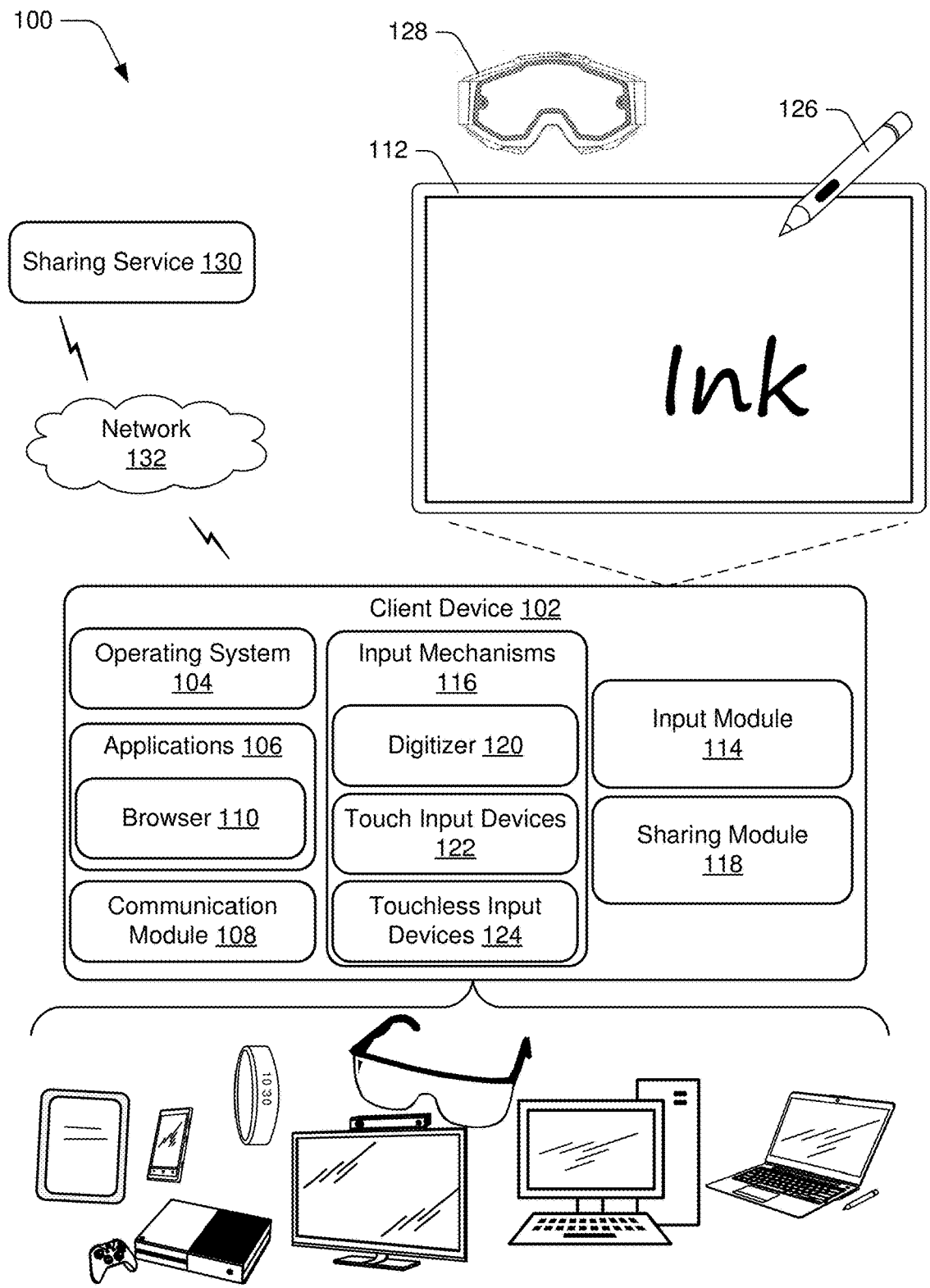
FIG. 1 is an illustration of an environment in an example implementation that is operable to employ techniques discussed herein in accordance with one or more embodiments.

Techniques for sharing across environments are described. Generally, different types of input may be employed to share content, such as using a pen (e.g., an active pen, a passive pen, and so forth), a stylus, a finger, touchless gesture input, and so forth. According to various implementations, content may be shared between devices in local proximity, and/or between devices that are remote from one another. In at least some implementations, content is shared based on an identity of a sharing user and/or sharing device.

According to various implementations, sharing across environments enables a touch input device to be used to share content between environments. For instance, a digital pen (hereinafter "pen") can be used to select and share content. For instance, the pen can be used to select content from a first device, and to share the content to a second, different device.

In at least some implementations, content shared by a pen is based on an identity of a user in possession of the pen. For instance, an identity of a user can be bound to a pen in various ways, such via biometric information, user authentication information, user behavioral information, and so forth. Accordingly, when the user performs an action with the pen to select content, the content can then be shared using the pen and based on the identity of the user. Further, when a different user takes possession of the pen, the identity of the different user is then bound to the pen such that the different user can select and share their own content. Thus, a single pen can be used in a collaborative environment to share content based on identities of different users that manipulate the pen.

Techniques for sharing across environments also enable content to be shared among different virtual reality ("VR") environments. For instance, a VR environment may include different workspaces that represent sub-regions of the VR environment associated with different respective users. Accordingly, the different users can cooperative to share content between their respective workspaces. In at least some implementations, sharing content from one workspace to another causes content to be shared between different respective client devices, such as client devices that host the respective workspaces.

In another example, content is shared between different distinct VR environments based on a cooperative share gesture between different users. For instance, a first user selects content from a first VR environment and engages in a share gesture with a second user associated with a second VR environment. The first and second VR environments, for instance, are presented via different respective devices. In response to the share gesture, the content is communicated from the first VR environment to the second VR environment.

Accordingly, techniques for sharing across environments described herein provide efficient ways of sharing content, such as by reducing a number of user interactions with a computing device required to share content as compared with legacy content sharing scenarios. By reducing user interactivity requirements for sharing content, computing resources such as processor, storage, and network resources are conserved.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for sharing across environments discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of a client device 102 is shown and described below in FIG. 10.

The client device 102 includes a variety of different functionalities that enable various activities and tasks to be performed. For instance, the client device 102 includes an operating system 104, applications 106, and a communication module 108. Generally, the operating system 104 is representative of functionality for abstracting various system components of the client device 102, such as hardware, kernel-level modules and services, and so forth. The operating system 104, for instance, can abstract various components (e.g., hardware, software, and firmware) of the client device 102 to the applications 106 to enable interaction between the components and the applications 106.

The applications 106 represents functionalities for performing different tasks via the client device 102. Examples of the applications 106 include a word processing application, a spreadsheet application, a web browser 110, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the client device 102 to communication over wired and/or wireless connections. For instance, the communication module 108 represents hardware and logic for communication via a variety of different wired and/or wireless technologies and protocols.

The client device 102 further includes a display device 112, an input module 114, input mechanisms 116, and a sharing module 118. The display device 112 generally represents functionality for visual output for the client device 102. Additionally, the display device 112 represents functionality for receiving various types of input, such as touch input, pen input, and so forth.

The input module 114 is representative of functionality to enable the client device 102 to receive input (e.g., via the input mechanisms 116) and to process and route the input in various ways.

The input mechanisms 116 generally represent different functionalities for receiving input to the client device 102, and include a digitizer 120, touch input devices 122, and touchless input devices 124. Examples of the input mechanisms 116 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 116 may be separate or integral with the display device 112; integral examples include gesture-sensitive displays with integrated touch-sensitive or motion-sensitive sensors. The digitizer 120 represents functionality for converting various types of input to the display device 112 the touch input devices 122, and the touchless input devices 124 into digital data that can be used by the client device 102 in various ways, such as for generating digital ink, generating input signals, biometric recognition, and so forth.

The touchless input devices 124 generally represent different devices for recognizing different types of non-contact input, and are configured to receive a variety of touchless input, such as via visual recognition of human gestures, object scanning, voice recognition, color recognition, and so on. In at least some embodiments, the touchless input devices 124 are configured to recognize gestures, poses, body movements, objects, images, and so on, via cameras. The touchless input devices 124, for instance, include a camera configured with lenses, light sources, and/or light sensors such that a variety of different phenomena can be observed and captured as input. For example, the camera can be configured to sense movement in a variety of dimensions, such as vertical movement, horizontal movement, and forward and backward movement, e.g., relative to the touchless input devices 124. Thus, in at least some embodiments, the touchless input devices 124 can capture information about image composition, movement, and/or position. The recognition module 108 can utilize this information to perform a variety of different tasks.

For example, the input module 114 can leverage the touchless input devices 124 to perform skeletal mapping along with feature extraction with respect to particular points of a human body (e.g., different skeletal points) to track one or more users (e.g., four users simultaneously) to perform motion analysis. In at least some embodiments, feature extraction refers to the representation of the human body as a set of features that can be tracked to generate input.

According to various implementations, the sharing module 118 represents functionality for performing various aspects of techniques for sharing across environments discussed herein. Various functionalities of the sharing module 118 are discussed below.

The environment 100 further includes a pen 126, which is representative of an instance of the touch input devices 122 for providing input to the display device 112 and/or other input surface. Generally, the pen 126 is in a form factor of a traditional pen but includes functionality for interacting with the display device 112 and other functionality of the client device 102. In at least some implementations, the pen 126 is an active pen that includes electronic components for interacting with the client device 102. The pen 126, for instance, includes a battery that can provide power to internal components of the pen 126.

Alternatively or additionally, the pen 126 may include a magnet or other functionality that supports hover detection over the display device 112. This is not intended to be limiting, however, and in at least some implementations the pen 126 may be passive, e.g., a stylus without internal electronics. Generally, the pen 126 is representative of an input device that can provide input that can be differentiated from other types of input by the client device 102. For instance, the digitizer 120 is configured to differentiate between input provided via the pen 126, and input provided by a different input mechanism such as a user's finger, a stylus, and so forth.

The environment 100 further includes a wearable device 128, which represents an implementation of the touchless input devices 124. Generally, the wearable device 128 represents functionality for presenting a virtual reality ("VR") environment. As used herein, VR environment refers to implementations of a virtual reality environment, an augmented reality environment, a mixed reality environment, and so forth. In at least some implementations, the wearable device 128 represents a head-mounted device, such as smart glasses and/or smart goggles. The wearable device 128 includes output functionality to display graphics and present audio output to a wearing user. The wearable device 128 further includes a camera and/or other sensors for detecting touchless input, such as user gestures and movement, such as discussed above. Alternatively or additionally, the wearable device 128 may be used in conjunction with an external camera or other sensors for detecting touchless input.

The environment 100 further includes a sharing service 130 with which the client device 102 may communicate, e.g., via a network 132. Generally, the sharing service 130 may be leveraged to perform various aspects of sharing across environments described herein. In at least some implementations, the sharing service 130 represents a network-based service (e.g., a cloud service) that can perform various functionalities discussed herein.

The network 132 may be implemented in various ways, such as a wired network, a wireless network, and combinations thereof. In at least some implementations, the network 132 represents the Internet.

Having described an example environment in which the techniques described herein may operate, consider now a discussion of some example implementation scenarios in accordance with one or more embodiments.

Example Implementation Scenarios

This section describes some example implementation scenarios for sharing across environments in accordance with one or more implementations. The implementation scenarios may be implemented in the environment 100 described above, the system 1000 of FIG. 10, and/or any other suitable environment. The implementation scenarios and procedures, for example, describe example operations of the client device 102, the sharing module 118, and/or the sharing service 130. In at least some embodiments, steps described for the various scenarios and procedures are implemented automatically and independent of user interaction.

Figure 2:
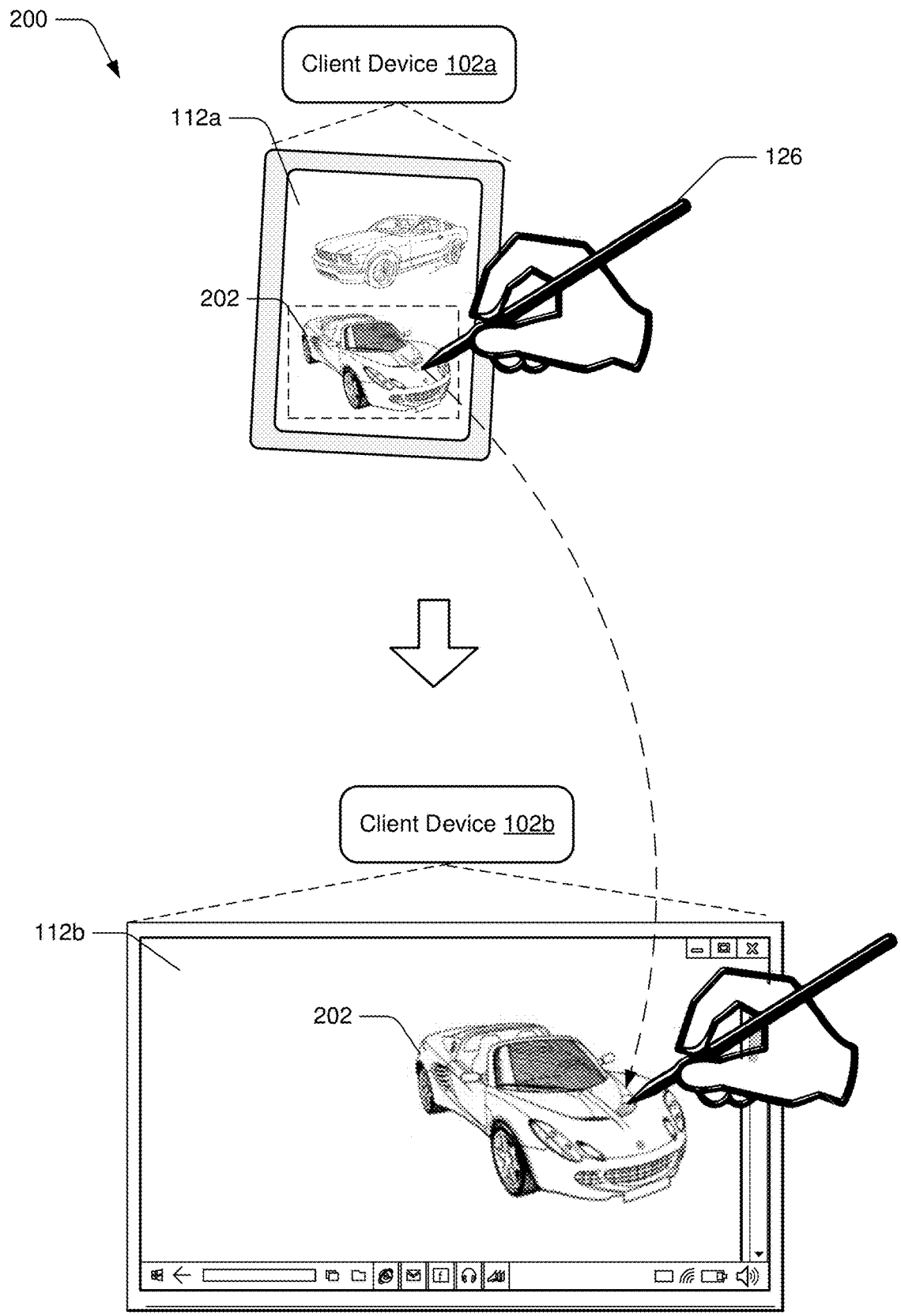
FIG. 2 depicts an example implementation scenario for using a pen for sharing across devices in accordance with one or more embodiments.

FIG. 2 depicts an example implementation scenario 200 for using a pen for sharing across devices in accordance with one or more implementations. The upper portion of the scenario 200 includes a client device 102a, which represents an instance of the client device 102 described above. According to the scenario 200, a user manipulates the pen 126 to select content 202. In this particular scenario, the content 202 represents an image displayed on a display 112a of the client device 102a. The usage of images in this and the following scenarios is for purposes of illustration only, and it is to be appreciated that techniques described herein can be employed to share any type of content, such as video, audio, files, folders, network locations, and so forth.

Responsive to selection of the content 202, a copy of the content 202 is paired with the pen 126. For instance, the pen 126 has a unique identity, such as based on internal electronic components that identify the pen 126. In at least some implementations, responsive to selection of the content 202, a copy of the content 202 is uploaded to the sharing service 130, which stores the copy as being associated with the pen 126.

Proceeding to the lower portion of the scenario 200, the user taps the pen 126 on a display 112b of a client device 102b, which represents a different instance of the client device 102. The client devices 102a, 102b, for instance, represents different devices at a particular location, such as an office, a conference room, a home, and so forth. Alternatively, the client devices 102a, 102b are remote from one another.

Continuing with the scenario 200, tapping the pen 126 on the display 112b causes the content 202 to be copied to the client device 102b. The content 202, for instance, is shared (e.g., pasted) to the client device 102b and displayed on the display 112b. In at least some implementations, tapping the pen 126 on the display 112b causes the client device 102b to query the sharing service 130 with an identity of the pen 126. Accordingly, the sharing service 130 identifies that the content 202 has been selected by the pen 126, and thus communicates a copy of the content 202 to the client device 102b.

Alternatively or additionally, the client devices 102a, 102b can have a direct connection, such as a direct wired and/or wireless connection between the devices. Examples of a direct connection include a cable connection, Bluetooth, WiFi Direct, and so forth. In such a scenario, the client device 102b detects the pen input to the display 112b, and thus queries the client device 102a with an identity of the pen 126. The client device 102a detects that the content 202 has been selected by the pen 126, and thus communicates a copy of the content 202 over the direct connection to the client device 102b.

Accordingly, the scenario 200 illustrates that instances of content can be bound to an input device such as the pen 126 such that the content is portable and can be shared across a variety of different devices at a variety of different locations.

Figure 3:
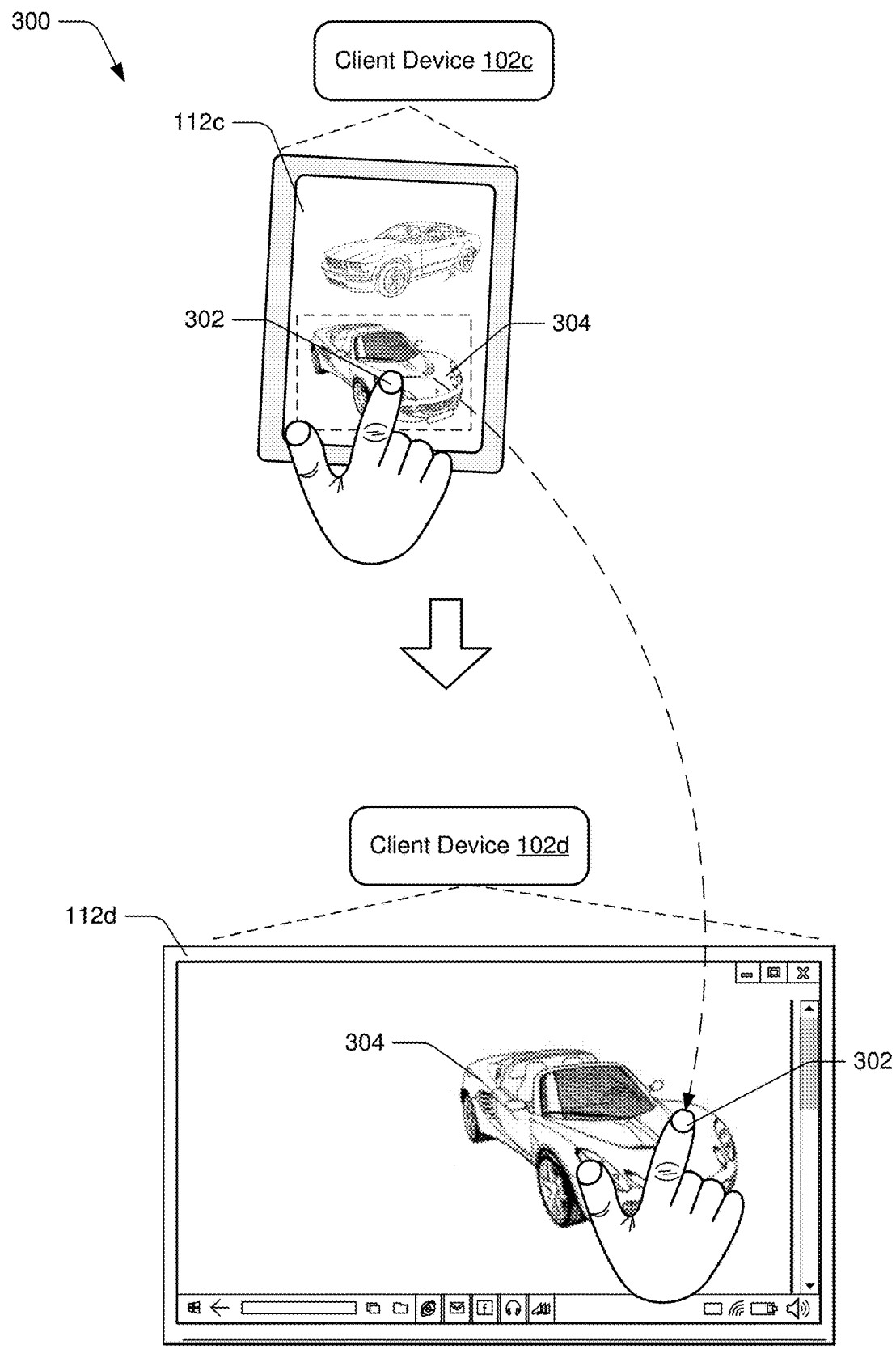
FIG. 3 depicts an example implementation scenario for touch input for sharing across devices in accordance with one or more embodiments.

FIG. 3 depicts an example implementation scenario 300 for touch input for sharing across devices in accordance with one or more implementations. The upper portion of the scenario 300 includes a client device 102c, which represents an instance of the client device 102 described above. According to the scenario 300, a user manipulates a finger 302 to select content 304. In this particular scenario, the content 304 represents an image displayed on a display 112c of the client device 102c.

Responsive to user selection of the content 304, the content 304 is bound to an identity of the user. For instance, the content 304 is saved to a clipboard of the user, such as a clipboard maintained by the client device 102c and/or the sharing service 130. Generally, various techniques may be employed to bind the content 304 to the identity of the user. For instance, a biometric identification may be used to identify the user, such as via fingerprint recognition of the finger 302 on the display 112c, facial recognition employed by the client device 102c, and so forth.

Proceeding to the lower portion of the scenario 300, the user taps their finger 302 on a display 112d of a different client device 102d. Accordingly, the content 304 is shared to the client device 102d. The client device 102d, for instance, captures identification information for the user, such as biometric data (e.g., a fingerprint of the finger 302), authentication data, and so forth. The client device 102d then queries the sharing service 130 with the identification information. The sharing service 130 ascertains that the content 304 has been selected by the user, and thus communicates a copy of the content 304 to the client device 102d.

Alternatively or additionally, a copy of the content 304 is shared via direct negotiation between the client devices 102c, 102d. For instance, responsive to detecting an identity of the user, the client device 102d queries the client device 102c with the identity. Accordingly, the client device 102c communicates a copy of the content 304 to the client device 102c, such as via a direct connection between the client device 102c and the client device 102d.

Accordingly, the scenario 300 illustrates that techniques for sharing across environments can be leveraged to tie content directly to a user identity such that the content is portable and sharable based on the user identity.

Figure 4:
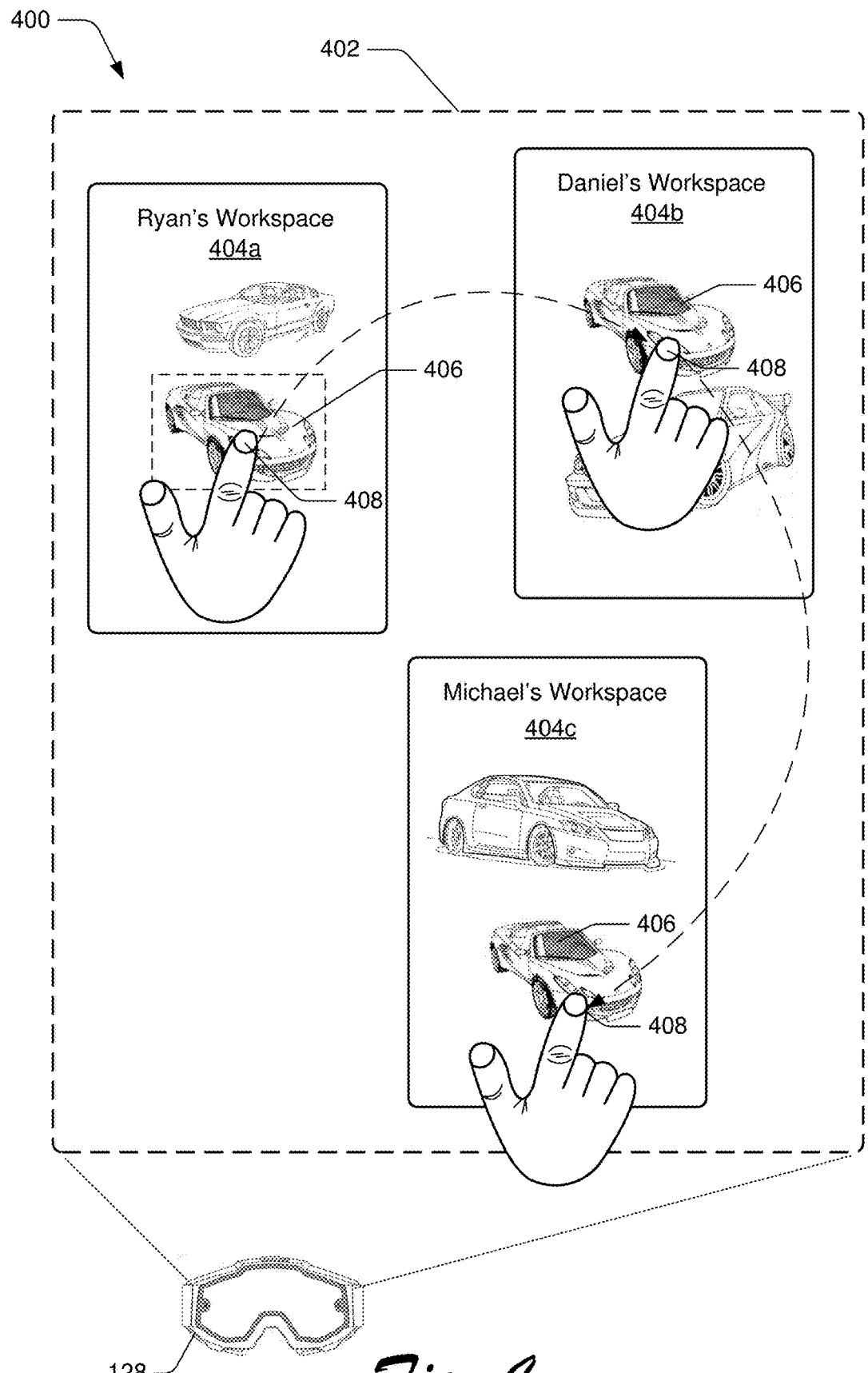
FIG. 4 depicts an example implementation scenario for sharing via a virtual reality environment in accordance with one or more embodiments.

FIG. 4 depicts an example implementation scenario 400 for sharing via a VR environment in accordance with one or more implementations. The scenario 400 includes the wearable device 128 and a VR environment 402 that is presented via the wearable device 128. A user that is wearing the wearable device 128, for instance, views the VR environment 402 and can interact with and manipulate various aspects of the VR environment 402. Generally, the VR environment 402 can be implemented in various ways, such as a wholly virtual reality environment, a mixed reality environment, an augmented reality environment, and so forth.

The VR environment 402 includes visual representations of different workspaces, including a workspace 404a, a workspace 404b, and a workspace 404c. Generally, each of the workspaces 404a-404c is associated with a different user and/or user identity. In at least some implementations, the workspaces 404b, 404c represent state information for different devices, and are communicated from the devices to the wearable device 128. In this particular example, the workspace 404a is associated with an identity of a user that is wearing the wearable device 128. Accordingly, the user selects content 406 from their workspace 404a and shares the content 406 to the workspaces 404b, 404c. The user, for instance, applies a selection gesture with their finger 408 to the content 406 in the workspace 404a, and then applies a share gesture with the finger 408 to the workspaces 404b, 404c. Generally, the selection gesture and the share gesture represent different movements of the finger 408 that are recognized by the wearable device 128 as being tied to different particular actions, e.g., selection and sharing, respectively.

According to various implementations, sharing the content 406 causes the VR environment 402 to be updated to indicate that the workspaces 404b, 404c now have a copy of the content 406. Further, the content 406 may correspondingly be shared from the wearable device 128 to devices associated with the workspaces 404b, 404c.

Accordingly, the scenario 400 illustrates that techniques for sharing across environments can be employed to share content within a VR environment and across devices tied to a VR environment.

Figure 5:
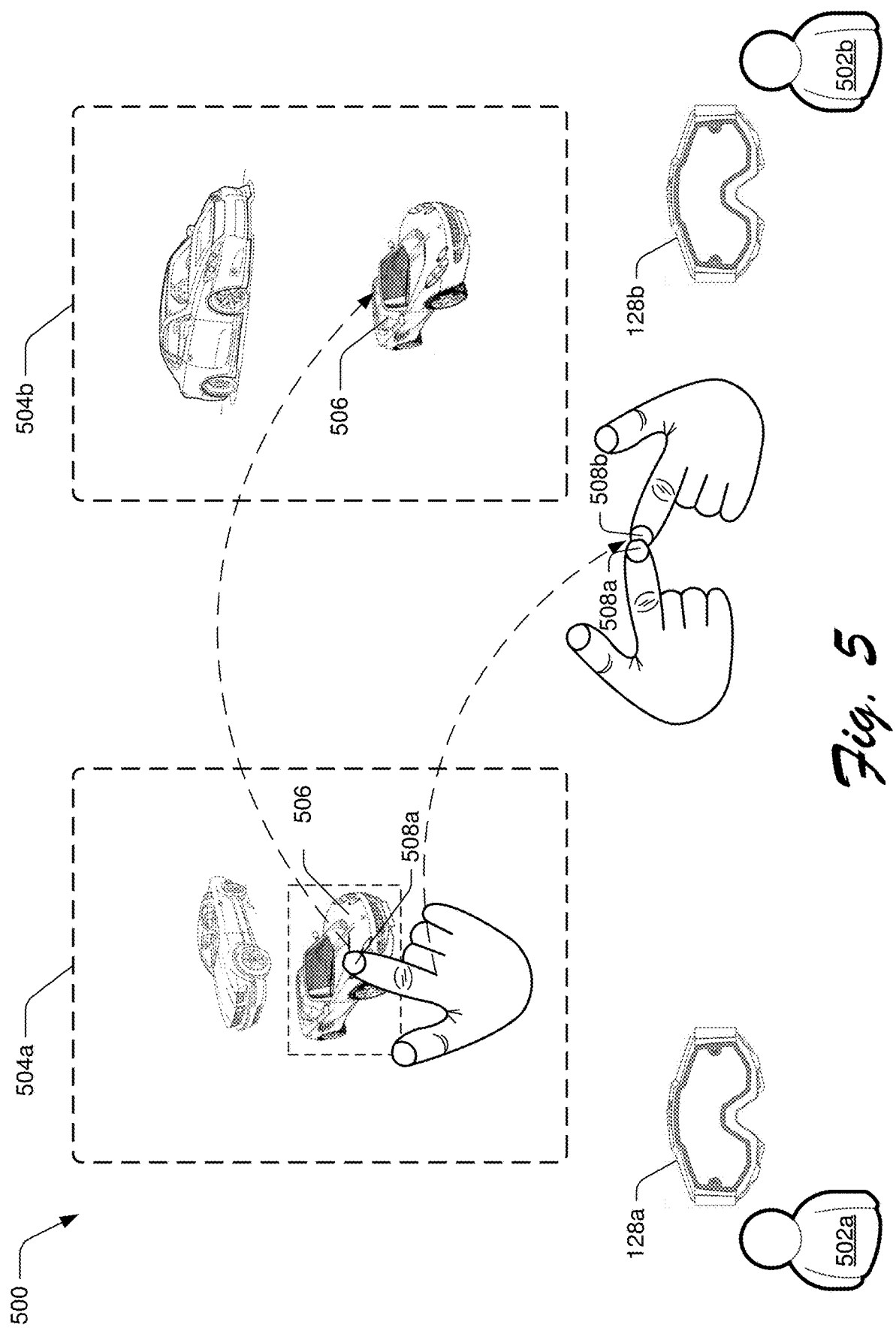
FIG. 5 depicts an example implementation scenario for sharing via a virtual reality environment in accordance with one or more embodiments.

FIG. 5 depicts an example implementation scenario 500 for sharing via a VR environment in accordance with one or more implementations. The scenario 500 includes a user 502a wearing a wearable device 128a, and a user 502b wearing a wearable device 128b. Generally, the wearable devices 128a, 128b represent instances of the wearable device 128.

The user 502a views and can interact with a VR environment 504a via the wearable device 128a, and the user 502b views and can interact with a VR environment 504b via the wearable device 128b. The VR environments 504a, 504b, for instance, represent different VR environments associated with the users 502a, 502b, respectively. Alternatively or additionally, the VR environments 504a, 504b represent different portals to a common VR environment shared by the users 502a, 502b.

Further to the scenario 500, the user 502a selects content 506 with their finger 508a from within the VR environment 504a. The content 506 generally represents an image stored in conjunction with the VR environment 504a. The content 506, for instance, is stored by a client device associated with the user 502a, and/or by the sharing service 130. After selecting the content 506, the user 502a shares the content 506 with the user 502b via a sharing gesture. For instance, the user 502a taps a finger 508b of the user 502b with their finger 508a. Accordingly, the wearable device 128a and/or the wearable device 128b detects the sharing gesture, and causes a copy of the content 506 to be shared to the VR environment 504a of the user 502a. The wearable device 128a and/or the wearable device 128b, for example, includes a camera that senses proximity of and/or contact between the fingers 508a, 508b.

In an example implementation, a copy of the content 506 is shared to the sharing service 130, which causes a copy of the content 506 to be shared to a representation of the VR environment 504b maintained by the sharing service 130 and/or by one or more client devices of the user 502b. Alternatively or additionally, a copy of the content 506 is shared directly from a client device of the user 502a to a client device of the user 502b, such as via a network connection or a direct connection between the client devices.

Accordingly, the scenario 500 illustrates that techniques for sharing across environments can be employed to share content via VR environments via interaction between users participating in VR environments.

Figure 6:
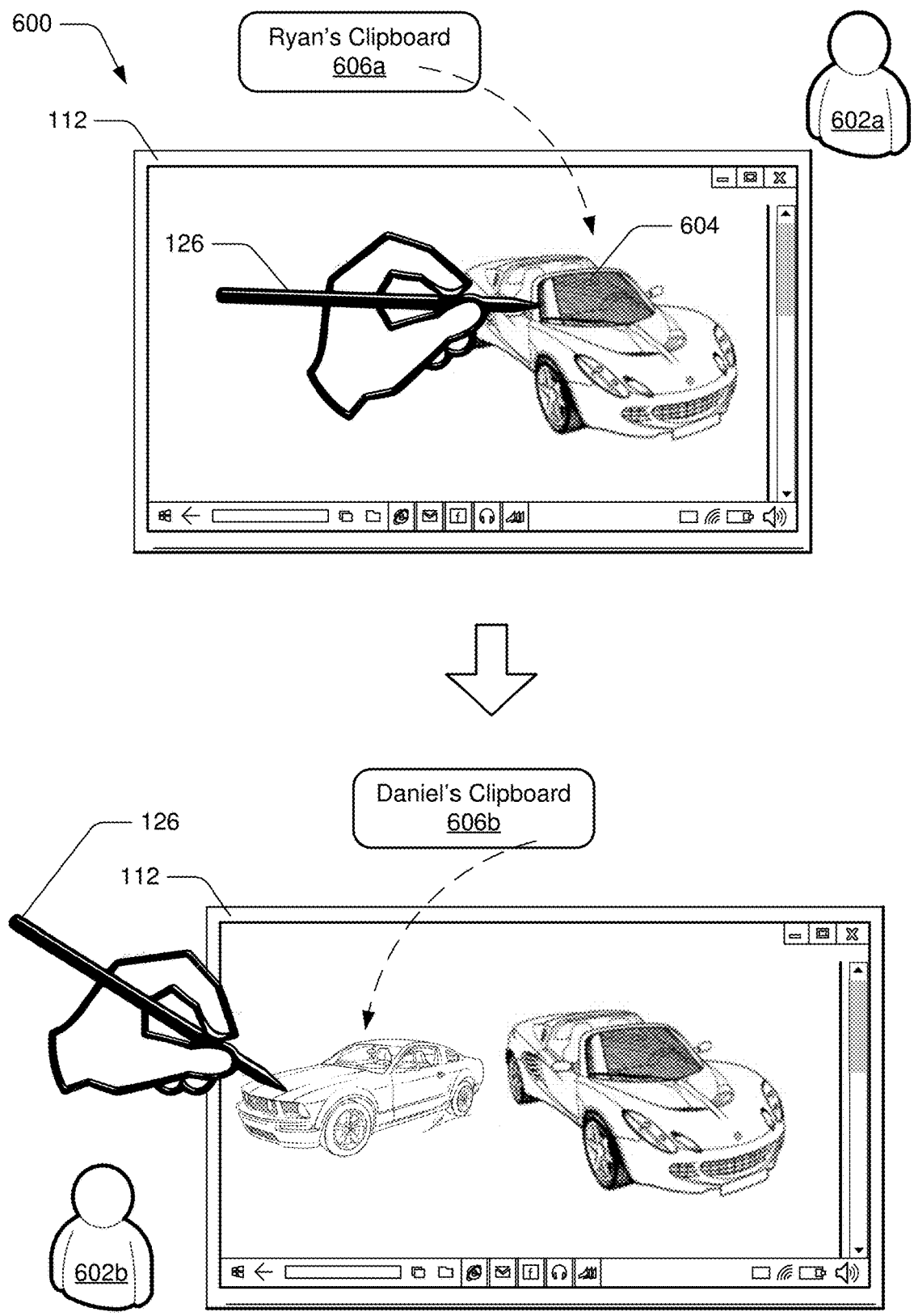
FIG. 6 depicts an example implementation scenario for sharing via a common sharing apparatus in accordance with one or more embodiments.

FIG. 6 depicts an example implementation scenario 600 for sharing via a common sharing apparatus in accordance with one or more implementations. The scenario 600 includes a user 602a interacting with the display 112 of the client device 102 via the pen 126. The user 602a manipulates the pen 126 to share content 604 from the user's clipboard 606a to the display 112. According to various implementations, the client device 102 ascertains that the pen 126 is bound to an identity of the user 602a, and thus interactions by the pen 126 with the display 112 are based on an identity of the user 602a. For instance, a share gesture by the user 602a to the display 112 causes content from the user's clipboard 606a to be shared to the display 112.

Generally, different techniques may be employed to bind an identity of a user to a sharing apparatus such as the pen 126. For instance, the user 602a can perform an authentication procedure to bind the pen 126 to an identity of the user 602a. The user 602a, for example, can sign their name on the surface of the display 112. The sharing module 118 and/or the sharing service 130 can perform character recognition on the signature to recognize that the signature is associated with an identity of the user 602a. Accordingly, a link between the pen 126 and the user's identity is made such that interactions by the pen 126 with the display 112 are based on the identity of the user 602a.

As another example, various types of biometric data can be utilized to bind a sharing apparatus with a user identity. For instance, the pen 126 and/or the client device 102 may include a biometric sensor such as a fingerprint sensor. By matching biometric data (e.g., a fingerprint) collected by the biometric sensor to a user identity, a link between the pen 126 and the user identity is established.

As yet another example, various types of behavioral data can be utilized to bind a sharing apparatus with a user identity. For instance, the client device 102 and/or the pen 126 includes functionality for determining various characteristics relating to how a user manipulates the pen 126 when providing input to the display 112. Examples of such characteristics include angle of the pen 126 relative to the display 112, grip pattern when holding the pen 126, pressure applied against the display 112 when providing input via the pen 126, handwriting recognition based on character shapes for specific characters (e.g., letters, numbers, and so forth) input via the pen 126. Such behavioral characteristics can be utilized to generate unique user profiles for individual users such that the users can be distinguished from one another when sharing via a sharing apparatus such as the pen 126.

Proceeding to the lower portion of the scenario 600, the user 602a hands the pen 126 to a user 602b. Accordingly, the client device 102 ascertains that the pen 126 is bound to an identity of the user 602b, and thus interactions by the pen 126 with the display 112 are based on an identity of the user 602b. A sharing identity associated with the pen 126, for example, is switched from the user 602a to the user 602b. Different ways of determining an identity of a user in possession of a sharing apparatus are described above. Further to the scenario 600, a share gesture by the user 602b to the display 112 causes content 606 from the user's clipboard 606b to be shared to the display 112.

Thus, the pen 126 may be used by different users and a currently active sharing identity may be switched based on which user currently has possession of the pen 126.

Accordingly, the scenario 600 illustrates that techniques for sharing across environments can be employed to bind different user identities to a sharing apparatus such that a currently active sharing identity is based on an identity of a user currently manipulating the apparatus.

While the scenarios presented above are discussed with reference to different implementations and environments, it is to be appreciated that the scenarios can be combined in various ways to enable sharing across a variety of different environments. For instance, when a user selects content in one environment and then transitions to another environment, the content remains bound to the user such that a subsequent sharing interaction by the user causes the content to be shared in the different environment. Thus, techniques for sharing across environments enable seamless sharing of various types of content between various instances and types of environments.

Having described some example implementation scenarios, consider now some example procedures for sharing across environments in accordance with one or more implementations.

Example Procedures

The following discussion describes some example procedures for sharing across environments in accordance with one or more embodiments. The example procedures may be employed in the environment 100 of FIG. 1, the system 1000 of FIG. 10, and/or any other suitable environment. The procedures, for instance, represent procedures for implementing the example implementation scenarios discussed above. In at least some embodiments, the steps described for the various procedures can be implemented automatically and independent of user interaction. The procedures may be performed locally at the client device 102, by the wearable device 128, by the sharing service 130, and/or via interaction between these functionalities. This is not intended to be limiting, however, and aspects of the methods may be performed by any suitable entity.

Figure 7:
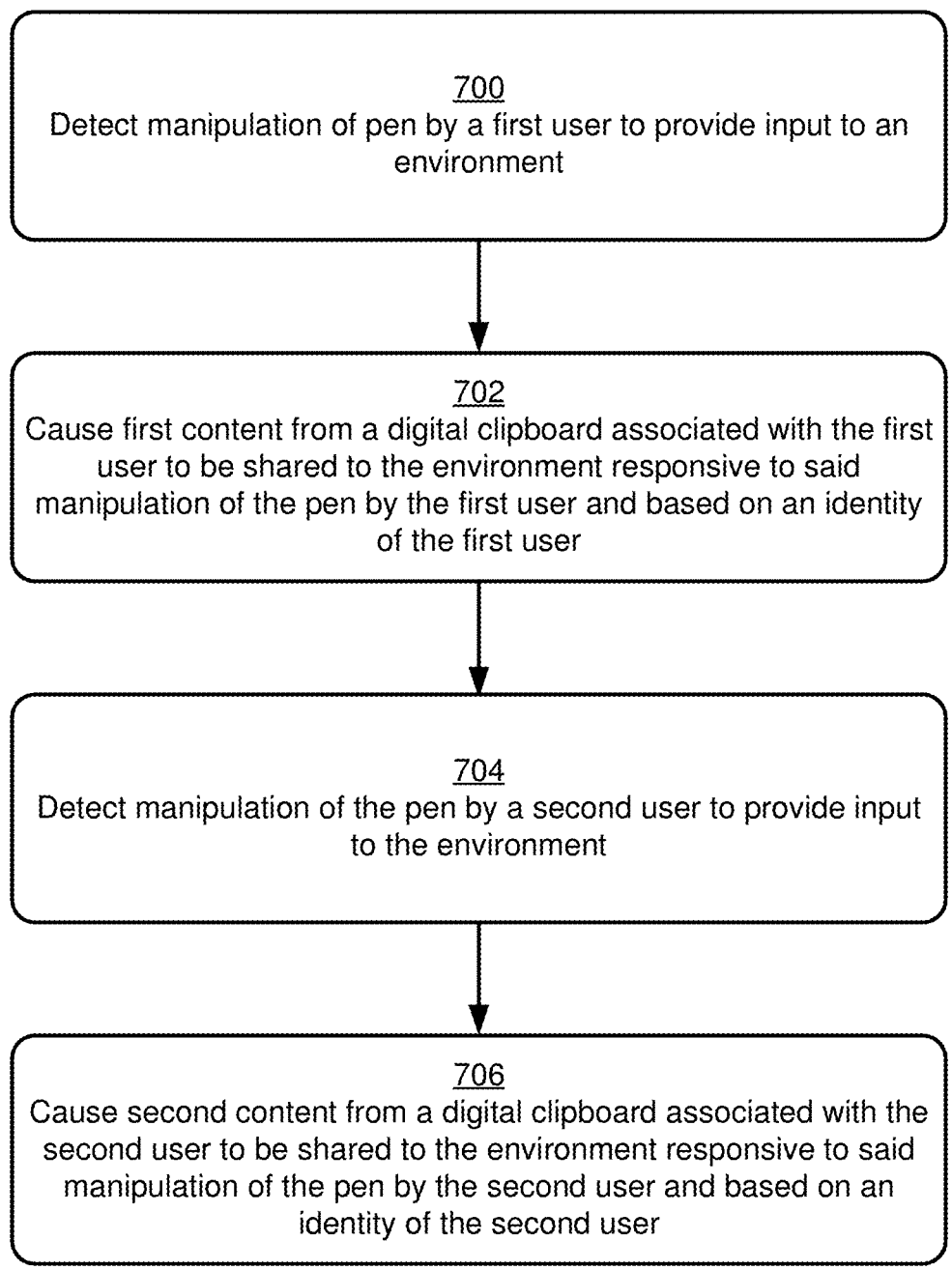
FIG. 7 is a flow diagram of an example method for sharing content using a pen in accordance with one or more embodiments.

FIG. 7 is a flow diagram that describes steps in a method in accordance with one or more embodiments. The method describes an example procedure for sharing content using a pen in accordance with one or more implementations.

Step 700 detects manipulation of pen by a first user to provide input to an environment. The ink module 114, for instance, detects that the pen 126 is used by a first user to apply an input event to the display 112 or a VR environment.

Step 702 causes first content from a digital clipboard associated with the first user to be shared to the environment responsive to said manipulation of the pen by the first user and based on an identity of the first user. The clipboard, for instance, represents a network storage location that stores content for the first user. Generally, the identity of the first user is ascertained in conjunction with the manipulation of the pen by the first user. Different techniques for ascertaining an identity of a user are discussed above, such as via a biometric sensor that resides on the pen 126, a user authentication procedure, behavioral characteristics pertaining to manipulation of the pen 126, and so forth.

The environment can be implemented in various ways, such as the client device 102, a virtual reality environment, a collaborative environment (e.g., a meeting-based device), and so forth. The content, for instance, can be shared from the sharing service 130 to a local device, such as the client device 102.

Step 704 detects manipulation of the pen by a second user to provide input to the environment. The ink module 114, for instance, detects that the pen 126 is used by a second user to apply an input event to the display 112 or a VR environment. For example, the ink module 114 detects an identity change associated with the pen 126, such as based on authentication of a different user to the pen 126.

Step 706 causes second content from a digital clipboard associated with the second user to be shared to the environment responsive to said manipulation of the pen by the second user and based on an identity of the second user. Generally, the identity of the second user is ascertained in conjunction with the manipulation of the pen 126 by the second user. Examples of different ways of ascertaining an identity of a user in conjunction with use of the pen 126 are discussed above.

According to various implementations, the second content is retrieved from a network storage location linked to an identity of the second user. The second content, for instance, is communicated from the network storage location to a local environment, such as the client device 102, a VR environment, and so forth.

Figure 8:
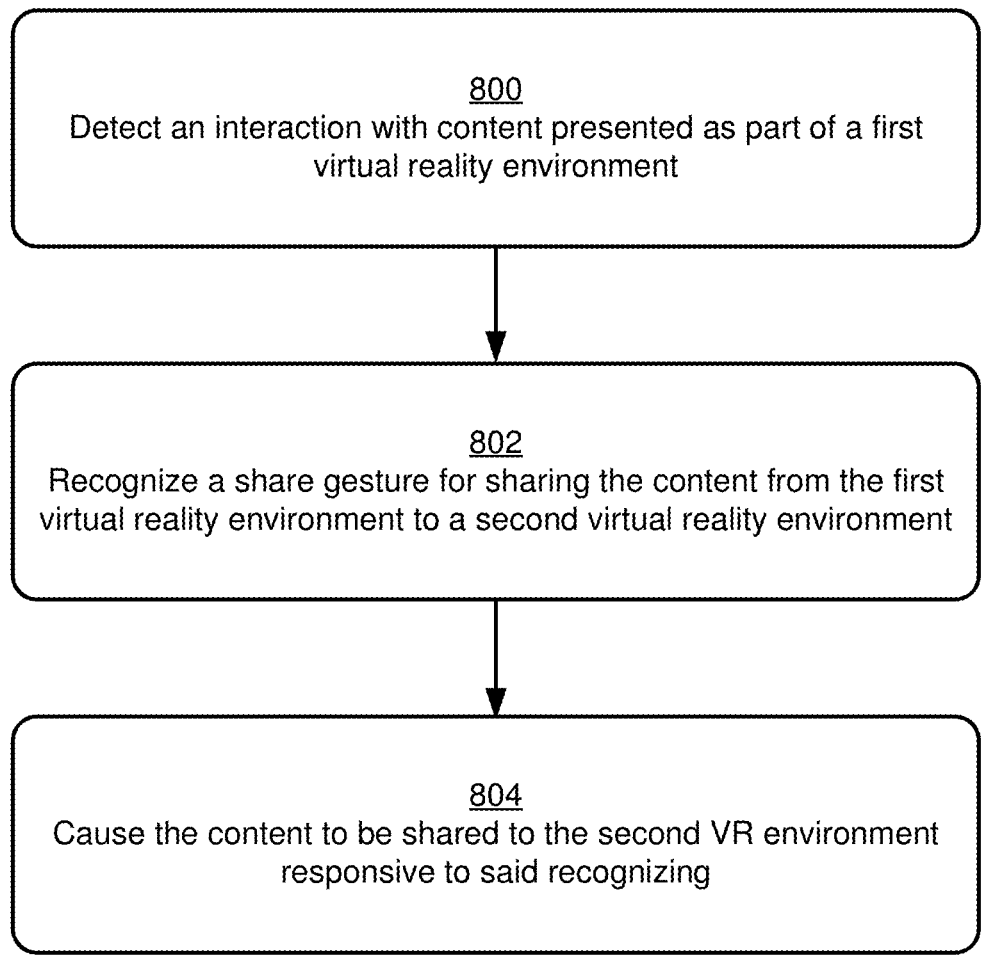
FIG. 8 is a flow diagram of an example method for sharing content across different virtual reality environments in accordance with one or more embodiments.

FIG. 8 is a flow diagram that describes steps in a method in accordance with one or more embodiments. The method describes an example procedure for sharing content across different virtual reality environments in accordance with one or more implementations.

Step 800 detects an interaction with content presented as part of a first virtual reality environment. The sharing module 118, for instance, detects that a user selects content represented in the first VR environment. The content, for instance, is visually represented in a VR environment presented via the wearable device 128.

Step 802 recognizes a share gesture for sharing the content from the first virtual reality environment to a second virtual reality environment. The second virtual reality environment, for instance, is displayed separately from the first virtual reality environment. For example, the first VR environment and the second VR environment are displayed in different respective instances of the wearable device 128.

In at least some implementations, the share gesture involves physical contact between different users. For instance, a first user selects the content from the first VR environment. The first user then engages in a cooperative gesture with a second user associated with the second VR environment. The cooperative gesture may be implemented in various ways, such as a finger touch between the users, a fist bump, and so forth. Alternatively, the share gesture represents a touchless cooperative gesture that does not involve physical contact but that involves different touchless gestures performed by the first user and the second user. Generally, the cooperative gesture combines gesture input from multiple users into an aggregate gesture that is recognized as a share gesture.

According to various implementations, the share gesture is recognizable in different ways. For instance, a wearable device that presents the first VR environment or the second VR environment can recognize the share gesture and cause an input signal associated with the gesture. Alternatively or additionally, the share gesture can be cooperatively recognized. For instance, a first device that presents the first VR environment can recognize a first portion of the share gesture, and a second device that presents the second VR environment can recognize a second, different portion of the share gesture. Accordingly, the two devices can communicate with each other to combine the different portions of the gesture and ascertain that the different portions are combined to generate the share gesture.

Step 804 causes the content to be shared to the second VR environment responsive to said recognizing. The content, for instance, is communicated from a device that hosts the first VR environment to a device that hosts the second VR environment. Alternatively or additionally, the content is communicated between network-based storage locations associated with the different respective VR environments, and/or from a network-based storage location to a device that hosts the second VR environment.

Figure 9:
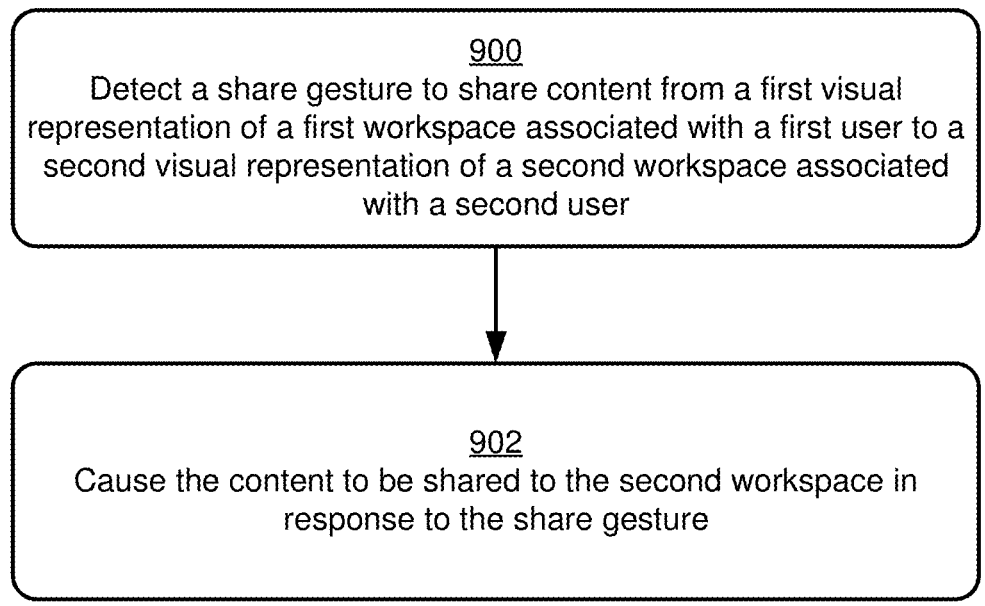
FIG. 9 is a flow diagram of an example method for sharing content within a virtual reality environment in accordance with one or more embodiments.

FIG. 9 is a flow diagram that describes steps in a method in accordance with one or more embodiments. The method describes an example procedure for sharing content within a virtual reality environment in accordance with one or more implementations.

Step 900 detects a share gesture to share content from a first visual representation of a first workspace associated with a first user to a second visual representation of a second workspace associated with a second user. The first visual representation and the second visual representation, for instance, are displayed as part of a single VR environment. For example, the VR environment is presented via a single device.

Generally, the visual representations of the different workspaces may be presented in various ways. For instance, the visual representations can be presented in different respective visual regions of the VR environment, such as depicted in the scenario 400.

In at least some implementations, the workspaces represent different devices states for the different users. The workspaces, for example, are representative of respective client devices for the different users. Thus, interaction with the visual representations of the workspaces within the VR environment can cause corresponding changes to the states of the different client devices, such as movement of content between the client devices.

The share gesture may be implemented in various ways, such as a touchless gesture of a single user, a cooperative gesture that involves multiple users (such as described above), a touch gesture on a touch device, and so forth.

Step 902 causing the content to be shared to the second workspace in response to the share gesture. For instance, a visual representation of the content is presented within the visual representation of the second workspaces as an indication that the content is shared to the second workspace.

Sharing the content to the second workspace can be realized in various ways. For instance, the content can be communicated from a client device associated with the first workspace to a client device associated with the second workspace. Alternatively or additionally, the content can be shared to a network storage location of the second user, such as from a client device and/or a network storage location of the first user.

Accordingly, techniques for sharing across environments described herein provide for various ways of sharing content across a variety of different environments.

Having described some example procedures for sharing across environments, consider now a discussion of an example system and device in accordance with one or more embodiments.

Example System and Device

Figure 10:
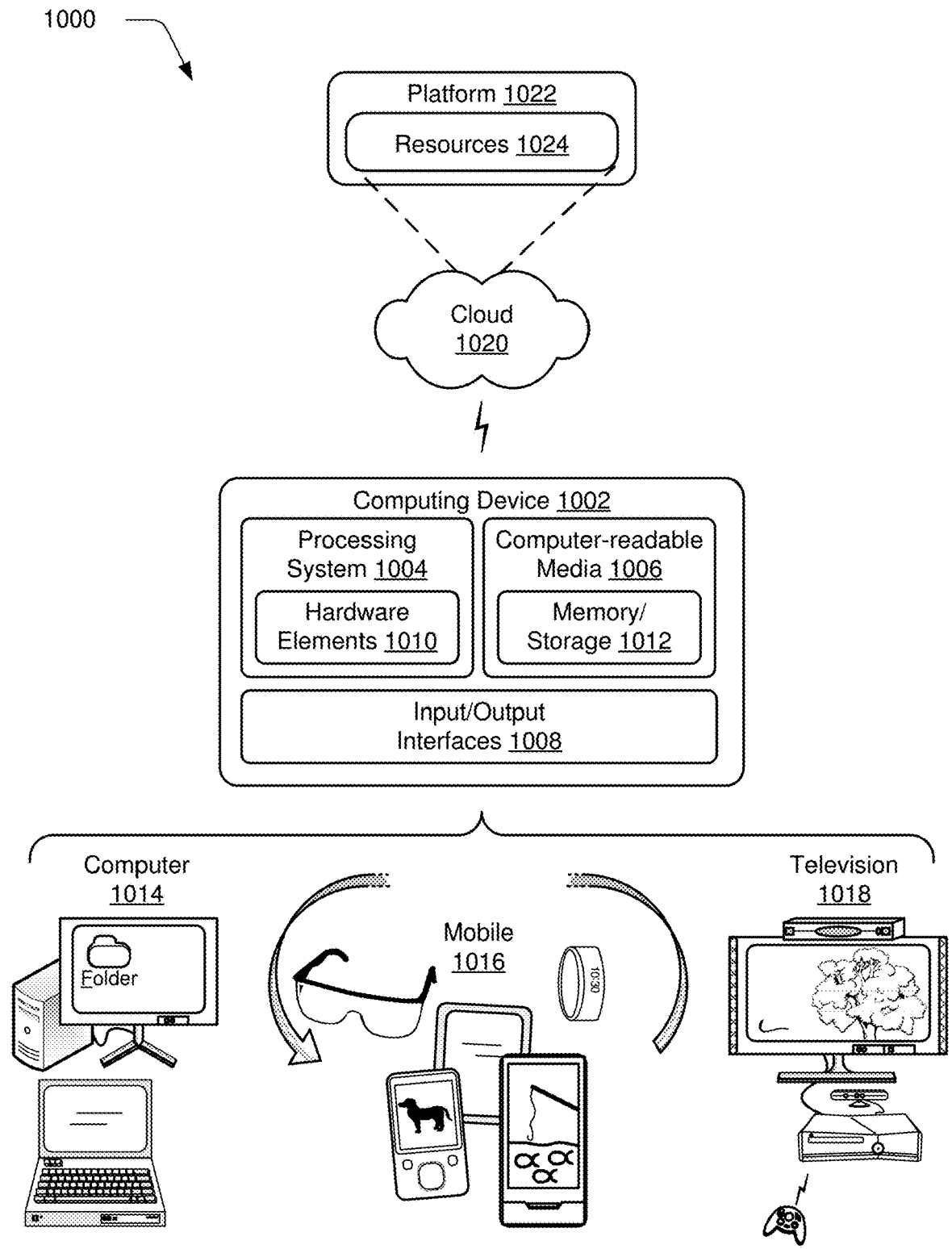
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, the client device 102 and/or the sharing service 130 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a wearable device, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the client device 102, the sharing module 118, and/or the sharing service 130 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1: A system for causing content to be shared to between virtual reality environments, the system including: one or more processors; and one or more computer-readable storage media storing computer-executable instructions that, responsive to execution by the one or more processors, cause the system to perform operations including: detecting an interaction with content presented as part of a first virtual reality environment; recognizing a share gesture for sharing the content from the first virtual reality environment to a second virtual reality environment, the second virtual reality environment being displayed separately from the first virtual reality environment; and causing the content to be shared to the second virtual reality environment responsive to said recognizing.

Example 2: The system as described in example 1, wherein the interaction with the content includes a user selection via a finger, and wherein the share gesture includes a user action with the finger.

Example 3: The system as described in one or more of examples 1 or 2, wherein the share gesture includes physical contact between a first user and a second user.

Example 4: The system as described in one or more of examples 1-3, wherein the share gesture includes a cooperative gesture between a first user and a second user.

Example 5: The system as described in one or more of examples 1-4, wherein the first virtual reality environment is associated with a first user, the second virtual reality environment is associated with a second user, and the share gesture includes physical contact between the first user and the second user.

Example 6: The system as described in one or more of examples 1-5, wherein the first virtual reality environment and the second virtual reality environment are displayed on different respective devices.

Example 7: The system as described in one or more of examples 1-6, wherein said causing includes causing the content to be shared to a device associated with the second virtual reality environment.

Example 8: The system as described in one or more of examples 1-7, wherein the first virtual reality environment is associated with a first user, the second virtual reality environment is associated with a second user, and wherein said causing includes causing the content to be shared to a device associated with the second user.

Example 9: The system as described in one or more of examples 1-8, wherein said causing includes causing the content to be shared to a cloud service.

Example 10: A method for causing content to be shared within a virtual reality environment, the method including: detecting a share gesture to share content from a first visual representation of a first workspace associated with a first user to a second visual representation of a second workspace associated with a second user, the first visual representation and the second visual representation being displayed as part of a single virtual reality environment; and causing the content to be shared to the second workspace in response to the share gesture.

Example 11: The method as described in example 10, wherein the single virtual reality environment is displayed on a single display device.

Example 12: The method as described in one or more of examples 10 or 11, wherein the first visual representation and the second visual representation are displayed as visually distinct regions of the virtual reality environment and are displayed as being associated with the first user and the second user, respectively.

Example 13: The method as described in one or more of examples 10-12, wherein the single virtual reality environment represents a mixed reality environment.

Example 14: The method as described in one or more of examples 10-13, wherein said causing includes causing the content to be shared from a device that hosts the virtual reality environment to a device associated with the second user.

Example 15: The method as described in one or more of examples 10-14, wherein said causing includes causing the content to be shared from a device that hosts the virtual reality environment to a cloud-based sharing service.

Example 16: The method as described in one or more of examples 10-15, wherein the virtual reality environment is hosted by a first device, and the second workspace is generated at a second device and communicated to the first device for display as part of the virtual reality environment.

Example 17: A method for enabling sharing of content associated with different users using a pen, the method including: detecting manipulation of pen by a first user to provide input to an environment; causing first content from a digital clipboard associated with the first user to be shared to the environment responsive to said manipulation of the pen by the first user and based on an identity of the first user ascertained in conjunction with the manipulation of the pen by the first user; detecting manipulation of the pen by a second user to provide input to the environment; and causing second content from a digital clipboard associated with the second user to be shared to the environment responsive to said manipulation of the pen by the second user and based on an identity of the second user ascertained in conjunction with the manipulation of the pen by the second user.

Example 18: The method as described in example 17, further including binding the identity of the second user to the input apparatus by on one or more of: an authentication procedure for the second user; biometric data of the second user; or a behavioral characteristic associated with the second user.

Example 19: The method as described in one or more of examples 17 or 18, further including binding the identity of the second user to the input apparatus based on a behavioral characteristic pertaining to the second user's grip on the pen.

Example 20: The method as described in one or more of examples 17-19, wherein the environment includes a single display device to which both the first content and the second content are shared.

Conclusion

Techniques for sharing across environments are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method comprising:
   detecting, through a client device, a first action, of a share gesture configured to share content between a first virtual reality environment and a second virtual reality environment, that comprises a user input selecting content in the first virtual reality environment;
   in response to a receipt of the first action of the share gesture, executing a first identity detection indicating an identity of a user that provided the user input selecting content in the first virtual reality environment;
   detecting a second action that completes the share gesture at the second virtual reality environment;
   in response to detecting the second action that completes the share gesture, executing a second identity detection indicating an identity of a user that executed the second action;
   confirming a completion of the share gesture by evaluating a result of the first identity detection with a result of the second identity detection; and
   completing the share gesture causing the content to be shared between the first virtual reality environment and the second virtual reality environment based on a confirmation of a completion of the share gesture.

2. The method of claim 1, wherein the client device is a virtual reality (VR) device configured to provide output functionality for rendering of a visual representation of the first virtual reality environment and a visual representation of the second virtual reality environment.

3. The method of claim 2, wherein the VR device is configured to provide each of the first virtual reality environment and the second virtual reality environment as one selected from a group that comprises: a virtual reality environment, an augmented reality environment, and a mixed reality environment.

4. The method of claim 2, wherein the VR device is a wearable device.

5. The method of claim 4, wherein the wearable device is one or more selected from a group that comprises: a head-mounted VR device, smart glasses and smart goggles.

6. The method of claim 1, wherein each of the first action of the share gesture and the second action of the share gesture are touch input gestures.

7. The method of claim 1, wherein the second action of the share gesture is a touch input gesture with another user that is associated with the second virtual reality environment.

8. The method of claim 1, wherein each of the first action of the share gesture and the second action of the share gesture are touchless input gestures.

9. The method of claim 1, wherein the second action of the share gesture is a touchless input gesture directed toward another user that is associated with the second virtual reality environment.

10. A virtual reality (VR) client device comprising:
one or more processors; and
one or more computer-readable storage media storing computer-executable instructions that, responsive to execution by the one or more processors, cause the VR client device to perform operations that comprise:
detecting, through the VR client device, a first action, of a share gesture configured to share content between a first virtual reality environment and a second virtual reality environment, that comprises a user input selecting content in the first virtual reality environment;
in response to a receipt of the first action of the share gesture, executing a first identity detection indicating an identity of a user that provided the user input selecting content in the first virtual reality environment;
detecting a second action that completes the share gesture at the second virtual reality environment;
in response to detecting the second action that completes the share gesture, executing a second identity detection indicating an identity of a user that executed the second action;
confirming a completion of the share gesture by evaluating a result of the first identity detection with a result of the second identity detection; and
completing the share gesture causing the content to be shared between the first virtual reality environment and the second virtual reality environment based on a confirmation of a completion of the share gesture.

11. The VR client device of claim 10, wherein the VR client device is configured to provide output functionality for rendering of a visual representation of the first virtual reality environment and a visual representation of the second virtual reality environment.

12. The VR client device of claim 10, wherein the VR client device is configured to provide each of the first virtual reality environment and the second virtual reality environment as one selected from a group that comprises: a virtual reality environment, an augmented reality environment, and a mixed reality environment.

13. The VR client device of claim 10, wherein the VR client device is a wearable device.

14. The VR client device of claim 13, wherein the wearable device is one or more selected from a group that comprises: a head-mounted VR device, smart glasses and smart goggles.

15. The VR client device of claim 10, wherein each of the first action of the share gesture and the second action of the share gesture are touch input gestures.

16. The VR client device of claim 10, wherein the second action of the share gesture is a touch input gesture with another user that is associated with the second virtual reality environment.

17. The VR client device of claim 10, wherein each of the first action of the share gesture and the second action of the share gesture are touchless input gestures.

18. The VR client device of claim 10, wherein the second action of the share gesture is a touchless input gesture directed toward another user that is associated with the second virtual reality environment.

19. An input device connected with one or more virtual reality (VR) environments, the input device comprising:
one or more processors; and
one or more computer-readable storage media storing computer-executable instructions that, responsive to execution by the one or more processors, cause the input device to perform operations that comprise:
detecting, through the input device, a first action, of a share gesture configured to share content between a first virtual reality environment and a second virtual reality environment, that comprises a user input selecting content in the first virtual reality environment;
in response to a receipt of the first action of the share gesture, executing a first identity detection indicating an identity of a user that provided the user input selecting content in the first virtual reality environment;
detecting a second action that completes the share gesture at the second virtual reality environment;
upon detecting the second action that completes the share gesture, executing a second identity detection indicating an identity of a user that executed the second action;
confirming a completion of the share gesture by evaluating a result of the first identity detection with a result of the second identity detection; and
completing the share gesture causing the content to be shared between the first virtual reality environment and the second virtual reality environment based on a confirmation of a completion of the share gesture.

20. The input device of claim 19, wherein the input device is one of: a digital pen device and a VR apparatus.

* * * * *